July 12, 1949.　　　　C. L. CLARK ET AL　　　　2,475,878
BALL AND SOCKET VEHICLE COUPLING
Filed July 19, 1946　　　　　　　　　　　　2 Sheets-Sheet 1
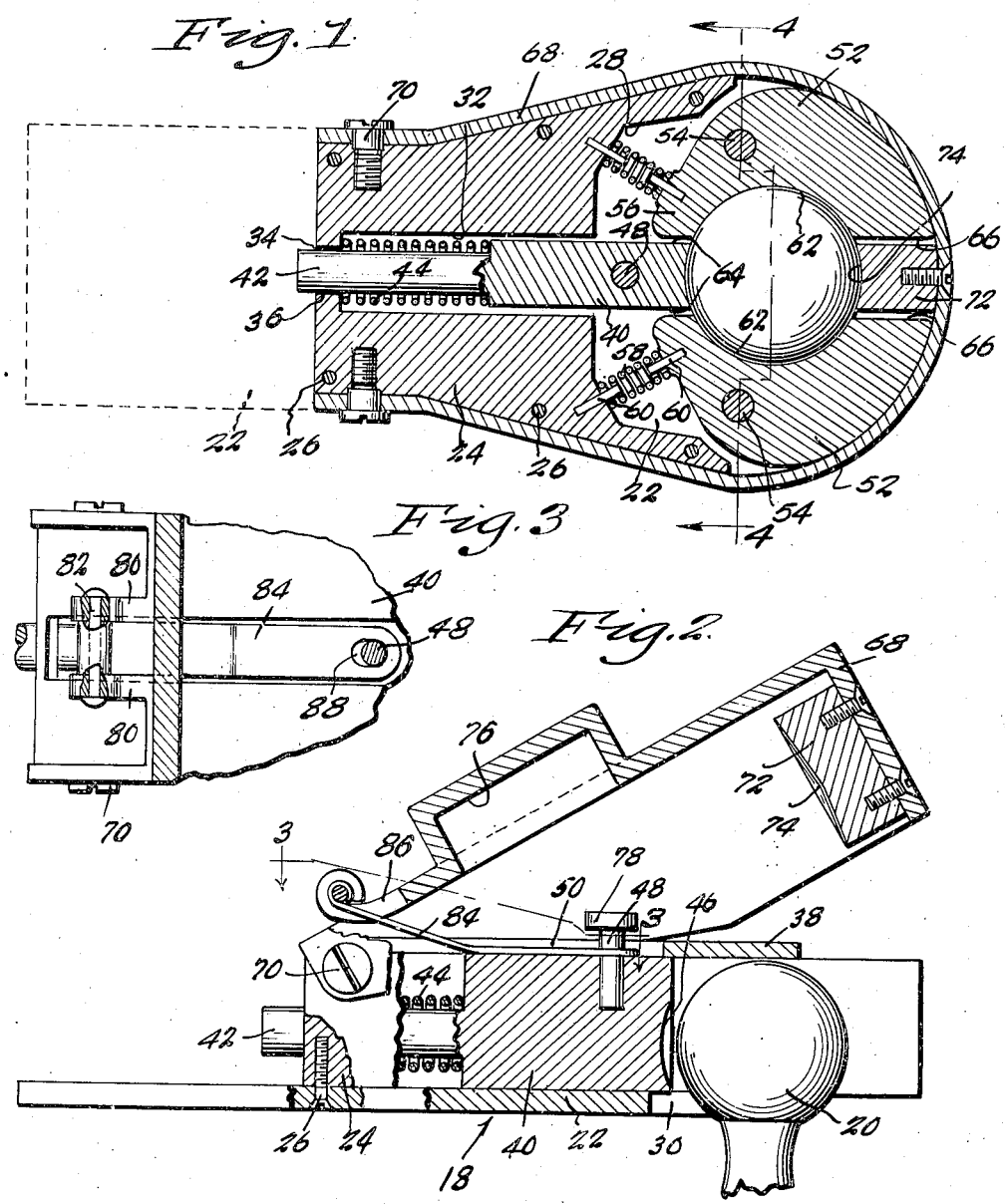
Inventor
CLARE L. CLARK
CHARLES E. DENISON
By Clarence A. O'Brien
and Harvey B. Jacobson
Attorneys July 12, 1949.    C. L. CLARK ET AL    2,475,878
BALL AND SOCKET VEHICLE COUPLING
Filed July 19, 1946    2 Sheets-Sheet 2
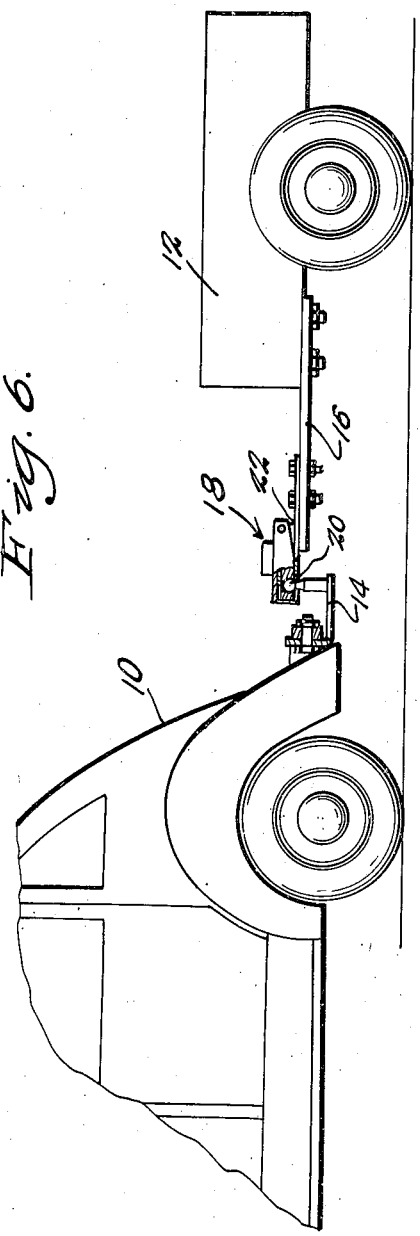
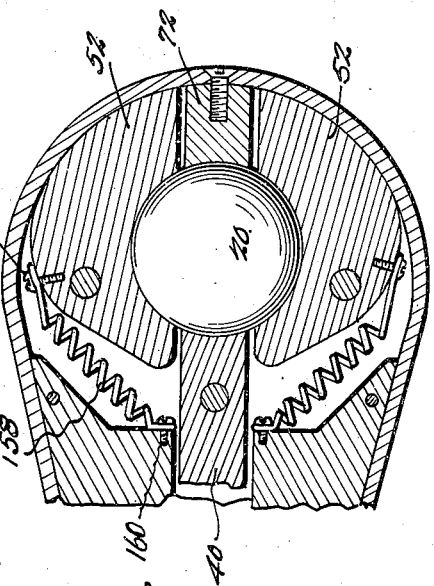
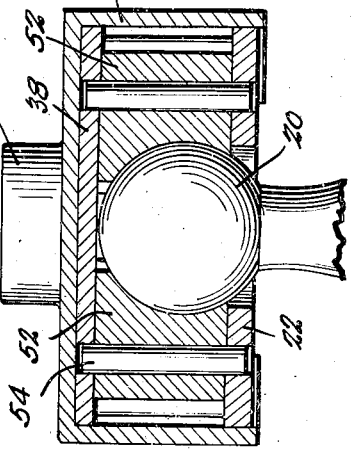
Inventor
CLARE L. CLARK
CHARLES E. DENISON
By Clarence A. O'Brien
and Harvey B. Jacobson
Attorneys Patented July 12, 1949

2,475,878

UNITED STATES PATENT OFFICE 2,475,878

BALL-AND-SOCKET VEHICLE COUPLING

Clare L. Clark and Charles E. Denison,
Billings, Mont.

Application July 19, 1946, Serial No. 684,949

12 Claims. (Cl. 280—33.17)

The present invention pertains to novel and useful improvements in a trailer hook and more specifically has reference to a coupling device for securing vehicle tongues to trailer drawbars.

It is a most important object of our invention to provide a drawbar coupling which has an improved, positive quick action.

A very important purpose of the invention resides in constructing a trailer coupling which facilitates the clamping and releasing action thereof.

Another important aim of the device comprises the formulation of a coupling device in accordance with the foregoing objects, which has extremely simple but dependable means to facilitate the operation of the hook.

Still another intention of our invention envisions the provision of an appliance which may conveniently be manipulated by one person and may be automatically released by remote control means.

Yet another object of the device contemplates the development of an assemblage which conforms to the preceding objects wherein a positive means is provided for maintaining the clutch in locked relation and in further positively preventing separation of the coupling from its load.

An additional purpose consists in providing a means for enclosing the mechanism which also cooperates therewith to positively lock or release the coupling action.

These, together with various ancillary objects to become later apparent as the following description proceeds, are attained by our arrangement, one embodiment of which has been illustrated by way of example in the accompanying drawings, wherein:

Figure 1 is a longitudinal horizontal sectional view through the preferred form of our coupling in locked position;

Figure 2 is a central, longitudinal, vertical section through the device, the cover and parts being shown in released relation;

Figure 3 is a fragmentary detail view being taken substantially upon the line 3—3 of Figure 2;

Figure 4 is a transverse sectional view taken substantially upon the line 4—4 of Figure 1;

Figure 5 is a horizontal sectional detail view, similar to Figure 3 but showing a modified form of spring means; and, Figure 6 is a partly diagrammatic and partly vertical sectional, fragmentary view of a car and trailer showing the coupling applied thereto.

Referring first to Figure 6, 10 denotes a motor vehicle which is hitched to a trailer 12 by means of a vehicle drawbar 14 and a trailer tongue 16 united by our improved coupling indicated generally at 18. It will be readily apparent that our device is not limited to use in a vehicle and trailer combination, but is equally applicable to any drawbar and a driven member associated therewith.

The drawbar 14 supports a ball 20 detachably engageable in the clutch assembly 18 suitably attached to the tongue 16. This assembly includes a base plate 22 surmounted by a block 24, removably secured at 26, and having a recessed or notched end portion 28, while the base plate 22 is similarly cut away at 30. Extending longitudinally of block 24 is a slot or bore 32 of rectangular cross-section communicating with recess 28 and terminating in a shoulder 34 which is pierced by a guide aperture 36.

By reference to Figures 2 and 4, it will be observed that a top plate 38 is adapted to overlie the cavity 28 in spaced parallel relation to base plate 22, being conveniently secured thereto by the fasteners 26. A latch 40 is guided and slidable in slot 32 and has a guide bar 42 slidable in aperture 36 and surrounded by a compression spring 44 seated between latch 40 and shoulder 34. The outer end of latch 40 has a spherical seat 46 cooperating with the ball 20. A latch pin or stem 48 extends upwardly from latch 40 and reciprocates in the guiding slot 50 in cover plate 38, for a purpose to presently become apparent.

A pair of arcuate clutch jaws 52 are journalled at 54 between cover and base plates 38 and 20 for pivotal movement in a horizontal plane, their rear ends 56 being freely received in the cavity 28. Compression springs 58 are engaged between the body 24 and the rear portion 56, being retained and guided by pins 60 and bias the jaws 52 about their pivots 54 in a direction to open the jaws. The inner surfaces of the jaws are provided with hemi-spherical sockets or recesses 62 which seat and retain the ball 20 therebetween. The adjacent, inner rear surfaces of jaws 52 have parallel heel portions 64 between which the latch 40 extends, the side of the latch engaging the heels to prevent their oscillatory movement thereby locking the jaws in their engaged position as shown in Figure 1. At their forward end, the jaws are formed with similar parallel toe portions 66 for a purpose to be subsequently explained.

A housing or cover 68 is laterally journalled at 70 to the body 24, and its periphery snugly embraces and encloses the circumference of the cover and base plates 38, 22 and the outer circumference of the jaws 52 and has extending inwardly therefrom a detachable boss 72 provided with a seat 74. When the cover 68 is closed, boss 72 is positioned between toes 66, and its seat 74 provides a safety means for engaging the ball 20 and retaining it in its seat in the recesses 62 and transmits part of the thrust therefrom to the tongue and base plate 22. It is intended that the jaws 52 shall be retained in their engaged position when the cover is closed by the inner circumference of the cover limiting the outward pivoting of jaws 52, while the latch 40 by its engagement with heels 64 additionally blocks any opening movement thereof. The upper surface of the housing 68 is recessed at 76 to accommodate the head 78 of the pin 48 during its sliding movement. At its rear end, cover 68 has spaced upturned lugs 80, journalling by fulcrum 82, a flexible tongue 84 extending through a slot 86 in the cover, and being secured to the pin 48 by an aperture 88. The arrangement is such that as the cover pivots about pins 70, the tongue 84 by its attachment to pin 48 reciprocates the latch 40 in its guide slot 32.

When the cover is raised, see Figure 2, the latch is withdrawn from between heels 64 against the action of spring 44, whereupon springs 58 are free to effect an opening or releasing oscillation of the jaws. Simultaneously, boss 72 is withdrawn from engagement with ball 20, thereby freeing the latter for longitudinal movement out of the notch 30 and from between jaws 52.

It is evident, that a remote control means such as a cable may be attached to cover 68 to effect this opening, and releasing movement. It will also be understood that rearward movement of the drawbar will force ball 20 through the guide slot 30 and into engagement with the heel portion 56 and the rear of seats 62, thereby forcing the jaws 52 to pivot in a closing movement about their fulcrums 54 and into seating and gripping engagement with ball 20. At this time, the heels 64 are open and the spring 44 biases latch 40 into locking relation between the heels 64, automatically fastening the coupler. During this last movement, the tongue 84 draws the cover 68 downward and boss 72 drops between toes 66.

It should be understood that in some applications of the invention, we may omit the tongue 84 and its function, whereby the cover will be manually closed and the pin 48 will be manually retracted to release latch 40.

In some installations, tension springs 158 may be substituted for compression springs 58. As shown in Figure 5, these springs may be anchored to the body 24, as by fasteners 160 and preferably have their opposite extremities attached at 162 to the surface of jaws 52. The construction is otherwise identical to that set forth above.

From the foregoing, it will be appreciated that various embodiments for realizing the principles of our invention will readily occur to those skilled in the art and consequently we contemplate employing all modifications falling within the scope of the appended claims.

We claim as our invention:

1. A drawbar coupling consisting of a base plate, a cover plate and a block secured therebetween, a pair of pivoted jaws journalled between said plates and forming a ball receiving socket therebetween, spring means urging said jaws to open position, a latch means engageable with said jaws and independent of said spring means for blocking releasing movement thereof, means for operating said latch, and a cover movably secured to said block for retaining said jaws in closed relation.

2. A drawbar coupling consisting of a base plate, a cover plate and a block secured therebetween, a pair of pivoted jaws journalled between said plates and forming a ball receiving socket therebetween, a latch means engageable with said jaws for blocking releasing movement thereof, means for operating said latch, and a cover movably secured to said block for retaining said jaws in closed relation, said operating means including a stem on said latch and a connecting means between said stem and said cover.

3. A drawbar coupling consisting of a base plate, a cover plate and a block secured therebetween, a pair of pivoted jaws journalled between said plates and forming a ball receiving socket therebetween, a latch means engageable with said jaws for blocking releasing movement thereof, means for operating said latch, and a cover movably secured to said block for retaining said jaws in closed relation, said operating means including a stem on said latch and a connecting means between said stem and said cover, said connecting means being operable to retract said latch upon opening movement of said cover.

4. A drawbar coupling consisting of a base plate, a cover plate and a block secured therebetween, a pair of pivoted jaws journalled between said plates and forming a ball receiving socket therebetween, a latch means engageable with said jaws for blocking releasing movement thereof, means for operating said latch, and a cover movably secured to said block for retaining said jaws in closed relation, said operating means including a stem on said latch and a connecting means between said stem and said cover, said connecting means extending through said cover and being pivoted externally thereon and operable to retract said latch upon opening movement of said cover.

5. A drawbar coupling consisting of a base plate, a cover plate and a block secured therebetween, a pair of pivoted jaws journalled between said plates and forming a ball receiving socket therebetween, a latch means engageable with said jaws for blocking releasing movement thereof, means for operating said latch, and a cover movably secured to said block for retaining said jaws in closed relation, said cover enclosing and retainingly engaging said jaws, and a boss carried by said cover and engageable with said ball in towing relation thereto.

6. A drawbar coupling consisting of a base plate, a cover plate and a block secured therebetween, a pair of pivoted jaws journalled between said plates and forming a ball receiving socket therebetween, a latch means engageable with said jaws for blocking releasing movement thereof, means for operating said latch, and a cover movably secured to said block for retaining said jaws in closed relation, said cover enclosing and retainingly engaging said jaws, and a boss carried by said cover and engageable with said ball in towing relation thereto, said boss extending between said jaws.

7. A drawbar coupling consisting of a base plate, a cover plate and a block secured therebetween, a pair of pivoted jaws journalled between said plates and forming a ball receiving socket therebetween, a latch means engageable with said jaws for blocking releasing movement thereof, means for operating said latch, and a cover movably secured to said block for retaining said jaws in closed relation, said operating means including a stem on said latch and a connecting means between said stem and said cover, said stem being guided in said cover plate.

8. A drawbar coupling consisting of a base plate, a cover plate and a block secured therebetween, a pair of pivoted jaws journalled between said plates and forming a ball receiving socket therebetween, a latch means engageable with said jaws for blocking releasing movement thereof, means for operating said latch, and a cover movably secured to said block for retaining said jaws in closed relation, said operating means including a stem on said latch and a connecting means between said stem and said cover, means in said cover plate to guide said stem, said connecting means being receivable in said guide means in said cover plate.

9. A drawbar consisting of a base plate, a cover plate and a block secured therebetween, a pair of jaws pivotally journaled between said plates and forming a ball receiving socket therebetween, a bore including a shoulder extending longitudinally through said body, a latch slidable in said bore and adapted to engage a ball, tension means seated in said shoulder and on said latch urging it into engaging relation, said latch thereby blocking releasing movement of the ball, means for operating said latch, and a cover pivotally secured to said block for retaining said drawbar in locked relation.

10. A drawbar consisting of a base plate, a cover plate and a block secured therebetween, a pair of jaws pivotally journaled between said plates and forming a ball receiving socket therebetween, a bore including a shoulder extending longitudinally through said body, a latch slidable in said bore and adapted to engage a ball, tension means seated in said shoulder and on said latch urging it into engaging relation, said latch thereby blocking releasing movement of the ball, a stem secured to said latch, a cover pivotally secured to said block and movable into selective locking and unlocking positions, means secured to said cover and engaged by said stem for operating said latch when said cover is moved into locking or unlocking position.

11. The combination of claim 10 wherein said last named means is a flexible tongue secured in said cover and a slot in said tongue through which said stem extends and a recess in said housing to receive the head of said stem.

12. The combination of claim 9 wherein said cover includes an arcuate boss adapted to assist in securing the ball in locked position.

CLARE L. CLARK.
CHARLES E. DENISON.

REFERENCES CITED

The following references are of record in the file of this patent:

UNITED STATES PATENTS

| Number | Name | Date |
| --- | --- | --- |
| 1,527,149 | Holland | Feb. 17, 1925 |
| 1,665,817 | Morton | Apr. 10, 1928 |
| 2,151,181 | Appell | Mar. 21, 1939 |
| 2,347,033 | Daton | Apr. 18, 1944 |